United States Patent
Song et al.

(10) Patent No.: US 12,215,823 B2
(45) Date of Patent: Feb. 4, 2025

(54) HEATED LUBRICANT PUMP

(71) Applicant: Graco Minnesota Inc., Minneapolis, MN (US)

(72) Inventors: Xiaochuang Song, Jiangsu Province (CN); Ji Bao Wu, Suzhou (CN); Zaixing You, Suzhou (CN); Jin Tian, Suzhou (CN)

(73) Assignee: Graco Minnesota Inc., Minneapolis, MN (US)

( * ) Notice: Subject to any disclaimer, the term of this patent is extended or adjusted under 35 U.S.C. 154(b) by 273 days.

(21) Appl. No.: 17/618,131

(22) PCT Filed: Jun. 26, 2019

(86) PCT No.: PCT/CN2019/093010
§ 371 (c)(1),
(2) Date: Dec. 10, 2021

(87) PCT Pub. No.: WO2020/258076
PCT Pub. Date: Dec. 30, 2020

(65) Prior Publication Data
US 2022/0275907 A1    Sep. 1, 2022

(51) Int. Cl.
*F16N 39/04* (2006.01)
*F04B 1/02* (2006.01)
(Continued)

(52) U.S. Cl.
CPC ............... *F16N 39/04* (2013.01); *F04B 1/02* (2013.01); *F04B 15/00* (2013.01); *F04B 23/023* (2013.01);
(Continued)

(58) Field of Classification Search
CPC .. F04B 1/02; F04B 15/00; F04B 15/02; F04B 23/023; F04B 23/02; F04B 23/021;
(Continued)

(56) References Cited

U.S. PATENT DOCUMENTS 1,933,403 A   10/1933   Wilson
1,977,831 A   10/1934   Marshall et al.
(Continued)

FOREIGN PATENT DOCUMENTS

CN   102537629 A   7/2012
CN   103429946 A   12/2013
(Continued)

OTHER PUBLICATIONS

Author: Beka-Max Title: Electric pump EP-1 Date published (mm/dd/yyyy): Jul. 31, 2016 Date accessed (mm/dd/yyyy): Dec. 9, 2023 Link: https://web.archive.org/web/20160731145602/https://centrallubenorthwest.com/pdfs/bekaep1.pdf (Year: 2016).*
(Continued)

*Primary Examiner* — Kenneth J Hansen
*Assistant Examiner* — Chirag Jariwala
(74) *Attorney, Agent, or Firm* — Kinney & Lange, P.A.

(57) ABSTRACT

A lubricant pump (14) and a method thereof are disclosed. The lubricant pump (14) includes a pump base (32) and a reservoir housing (30). The pump base (32) and the reservoir housing (30) define a lubricant reservoir for storing lubricant. One or more pump elements (34) extend at least partially into the lubricant reservoir. Heaters (36) are disposed on the pump base (32) proximate the pump elements (34). The heaters (36) are configured to heat the local area surrounding the pump elements (34), to thereby reduce the viscosity of the lubricant at the pump elements (34). The heaters (36) are electrically connected to a thermal switch (38) to control activation and deactivation of the heaters (36). With the lubricant pump (14) and the method thereof, the thermal switch (38) can control the heater (36) based on air temperature rather than the temperature of the lubricant, so the viscosity of lubricant is well controlled.

17 Claims, 7 Drawing Sheets

(51) Int. Cl.
    *F04B 15/00*     (2006.01)
    *F04B 23/02*     (2006.01)
    *F16N 13/02*     (2006.01)
    *F16N 13/00*     (2006.01)
    *F16N 13/06*     (2006.01)

(52) U.S. Cl.
    CPC .............. *F16N 13/02* (2013.01); *F16N 13/00* (2013.01); *F16N 2013/063* (2013.01); *F16N 2200/12* (2013.01); *F16N 2210/16* (2013.01); *F16N 2250/08* (2013.01)

(58) Field of Classification Search
    CPC ...... F04B 23/025; F04B 23/026; F16N 13/02; F16N 39/04; F16N 2013/063; F16N 13/06
    USPC .................................................. 219/544, 628
    See application file for complete search history.

(56) References Cited

U.S. PATENT DOCUMENTS

| | | | |
|---|---|---|---|
| 2,560,795 A | | 7/1951 | Harris |
| 2,894,102 A | | 7/1959 | Morris |
| 3,286,791 A | * | 11/1966 | Cofer ...................... F16N 39/00 |
| | | | 184/104.1 |
| 3,564,199 A | * | 2/1971 | Blaha ...................... H01C 7/027 |
| | | | 219/205 |
| 4,417,133 A | * | 11/1983 | Sanner .................... H05B 3/78 |
| | | | 219/205 |
| 4,925,373 A | | 5/1990 | Moate |
| 4,956,544 A | * | 9/1990 | Sayward, Jr. ............ H05B 3/82 |
| | | | 337/380 |
| 5,125,480 A | | 6/1992 | Gregory et al. |
| 6,405,810 B1 | | 6/2002 | Grach et al. |
| 7,740,457 B2 | | 6/2010 | Lehmann |
| 7,900,800 B2 | | 3/2011 | Hassler et al. |
| 8,936,135 B2 | | 1/2015 | Conley et al. |
| 9,086,186 B2 | | 7/2015 | Holland et al. |
| 9,388,940 B2 | | 7/2016 | Conley et al. |
| 2004/0103657 A1 | * | 6/2004 | Takahashi ........... F15B 21/0427 |
| | | | 60/453 |
| 2008/0095650 A1 | * | 4/2008 | Divisi .................... F04B 53/162 |
| | | | 417/521 |
| 2009/0101669 A1 | | 4/2009 | Hassler et al. |
| 2012/0171049 A1 | | 7/2012 | Paluncic et al. |
| 2016/0312777 A1 | | 10/2016 | Kreutzkaemper et al. |
| 2018/0371969 A1 | * | 12/2018 | McCormick ........... F01M 5/001 |
| 2019/0264669 A1 | * | 8/2019 | Wade ........................ F04B 7/02 |

FOREIGN PATENT DOCUMENTS

| | | | | |
|---|---|---|---|---|
| CN | 203731071 U | | 7/2014 | |
| CN | 203857252 U | | 10/2014 | |
| CN | 106065992 A | | 11/2016 | |
| CN | 107300119 A | | 10/2017 | |
| CN | 206973253 U | | 2/2018 | |
| CN | 207687646 U | | 8/2018 | |
| EP | 0595097 A1 | | 5/1994 | |
| EP | 1052445 A1 | | 11/2000 | |
| EP | 2479471 A2 | | 7/2012 | |
| EP | 2713092 A2 | | 4/2014 | |
| KR | 20150092499 A | * | 8/2015 | ............. F04B 23/04 |

OTHER PUBLICATIONS

International Search Report and Written Opinion for PCT Application No. PCT/CN2019/093010, Dated Mar. 26, 2020, pp. 10.
Second Chinese Office Action for CN Application No. 201980096517.6, Dated Jan. 11, 2023, pp. 17.
Extended European Search Report for EP Application No. 19934477.1, Dated Oct. 6, 2022, pp. 8.
First Chinese Office Action for CN Application No. 201980096517.6, Dated Aug. 1, 2022, pp. 16.
Extended European Search Report for EP Application No. 24170564.9, Dated Sep. 3, 2024, p. 6.
Korean Preliminary Rejection for KR Application No. 10-2022-7002359, Dated Sep. 2, 2024, p. 9.

* cited by examiner

HEATED LUBRICANT PUMP

BACKGROUND

This disclosure relates generally to lubricant pumps. More particularly, this disclosure relates to heating of lubricant pumps.

Lubricant pumps drive lubricant, such as grease, to various dispense points where the lubricant is applied to machinery. Seals, pistons, bearings, and other parts require lubrication with small, measured amounts of grease or oil over short, frequent time intervals to prevent wear, corrosion, over-lubrication, or under-lubrication. Lubricant is injected at specific locations that require lubrication by lubricant injectors. Lubricant is drawn from a lubricant reservoir and pumped to the lubricant injectors via a lubrication line.

The viscosity of the lubricant is temperature-dependent. As the temperature drops, the viscosity of the lubricant increases. The lubricant pump requires greater power to pump the more viscous lubricant to the dispense point.

SUMMARY

According to one aspect of the disclosure, a lubricant pump includes a pump base having an upper wall; a reservoir housing mounted on the pump base, the reservoir housing and the upper wall defining a lubricant reservoir; a first pump element at least partially disposed in the reservoir; a first heating element disposed in the reservoir proximate the first pump element; and a thermal switch disposed in the pump base and electrically connected to the first heating element and configured to control activation and deactivation of the first heating element.

According to another aspect of the disclosure, a method includes powering a drive of a lubricant pump, the drive configured to mechanically drive a pump element of the lubricant pump; and activating a heating element disposed within a reservoir of the lubricant pump proximate a pump body of the pump element based on an air temperature being below a lower threshold.

DETAILED DESCRIPTION

Figure 1:
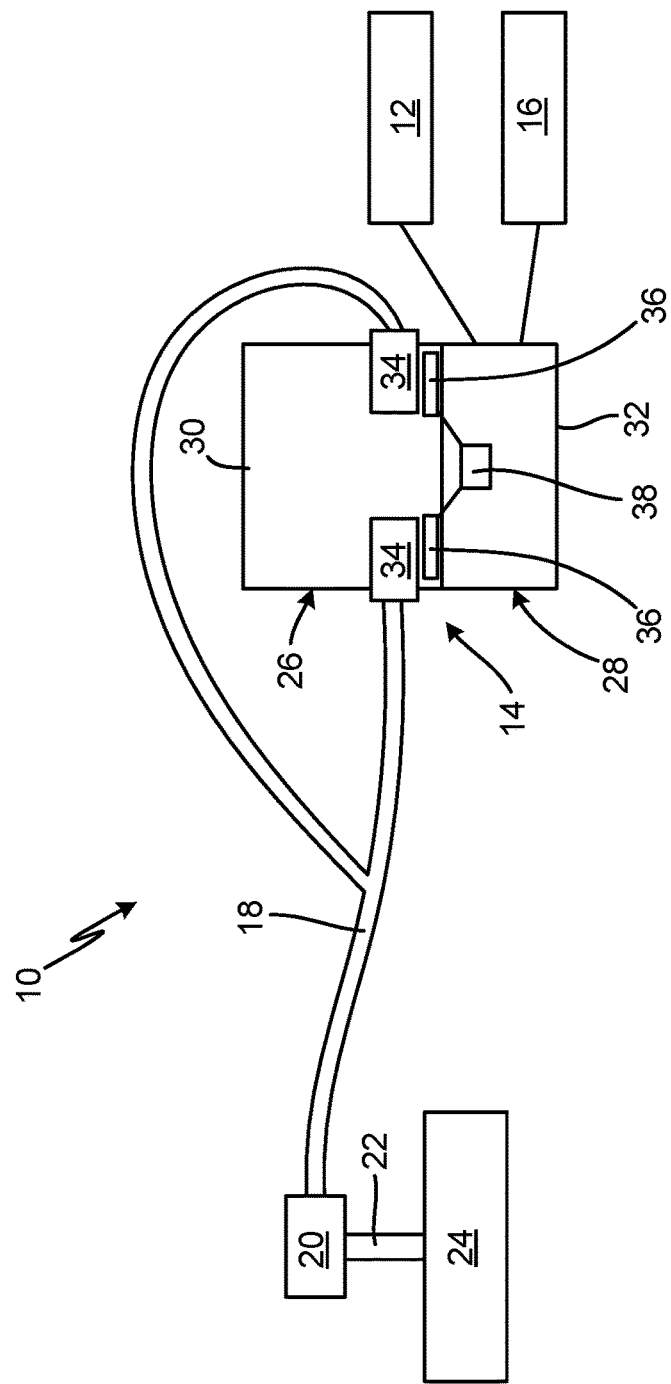
FIG. 1 is a schematic diagram of a lubrication system.

FIG. 1 is a schematic diagram of lubrication system 10, a system that receives, stores, and supplies lubricant to machinery. Lubrication system 10 includes control 12, lubricant pump 14, power source 16, lubrication line 18, lubricant injectors 20, supply line 22, and machinery 24. Lubricant pump 14 includes wet portion 26, dry portion 28, reservoir housing 30, pump base 32, pump element(s) 34, heaters 36, and thermal switch 38.

Control 12 is connected to lubricant pump 14. Power source 16 is connected to lubricant pump 14 to provide power to various components of lubricant pump 14. For example, power source 16 can be an electrical grid, a generator, a battery, or of any other type suitable for providing power to lubricant pump 14. In some examples, power source 16 can be configured to generate direct current (DC) power. In other examples, power source 16 can be configured to generate alternating current (AC) power.

Lubricant is stored in wet portion 26 of lubricant pump 14. Lubricant is not present in dry portion 28. Reservoir housing 30 and pump base 32 define wet portion 26. Pump base 32 defines dry portion 28. Pump elements 34 extend into reservoir housing 30 and are fluidly connected to wet portion 26 to receive lubricant from wet portion 26. Lubrication line 18 extends from pump 14 and is connected to lubricant injectors 20. Supply line 22 extend from lubricant injectors 20 and is connected to machinery 24. Heaters 36 are disposed in wet portion 26 proximate pump elements 34. Thermal switch 38 is disposed in dry portion 28 within pump base 32. As such, thermal switch 38 is not exposed to the lubricant within wet portion 26. Thermal switch 38 is electrically connected to heaters 36 to control activation and deactivation of heaters 36 based on the ambient temperature at thermal switch 38.

Lubrication system 10 is a dedicated lubrication assembly for use with lubricated machinery 24 such as pumps, pistons, seals, bearings, and/or shafts. Reservoir 16 stores lubricant for distribution to lubricant injectors 20, and lubricant injectors 20 provide set amounts of lubricant to machinery 24 at specific locations. Control 12 activates pump elements 34, such as by activating a motor that drives pump elements 34, to cause pump elements 34 to draw lubricant from reservoir 16 and drive the lubricant downstream through lubrication line 18.

Heaters 36 are disposed in wet portion 26 and are exposed to the lubricant within wet portion 26. Each heater 36 receives power from power source 16 and is configured to heat the local area at each pump element 34 to reduce the viscosity of the lubricant at pump element 34. In some examples, heaters 36 can be self-regulating heaters where the temperature generated by the heater 36 is regulated by the materials comprising the heater 36. As such, heaters 36 can be configured to generate heat up to a maximum temperature. Heating the lubricant and thereby reducing the viscosity of the lubricant facilitates efficient, effective pumping by pump elements 34.

Thermal switch 38 is electrically connected to heaters 36. Thermal switch 38 controls activation and deactivation of heaters 36. Thermal switch 38 is configured to electrically connect heaters 36 to power source 16, thereby activating heaters 36, when the temperature at thermal switch 38 falls below a threshold. Thermal switch 38 is configured to electrically disconnect heaters 36 from power source 16, thereby deactivating heaters 36, when the temperature at thermal switch 38 rises above the threshold. In some examples, thermal switch 38 can control activation and deactivation of heaters 36 based on different thresholds. For example, thermal switch 38 can activate heaters 36 when the temperature reaches or falls below a lower threshold and can deactivate heaters 36 when the temperature reaches or rises above an upper threshold. Thermal switch 38 can be of any type suitable for controlling activation and deactivation of heaters 36 based on the temperature. As discussed above, thermal switch 38 is disposed in dry portion 28 such that thermal switch 38 is not exposed to the lubricant. Thermal switch 38 controls activation and deactivation of heaters 36 based on air temperature, not the temperature of the lubricant. It is understood, however, that thermal switch 38 can, in some examples, be exposed to the lubricant to control heaters 36 based on the actual lubricant temperature.

Figure 2A:
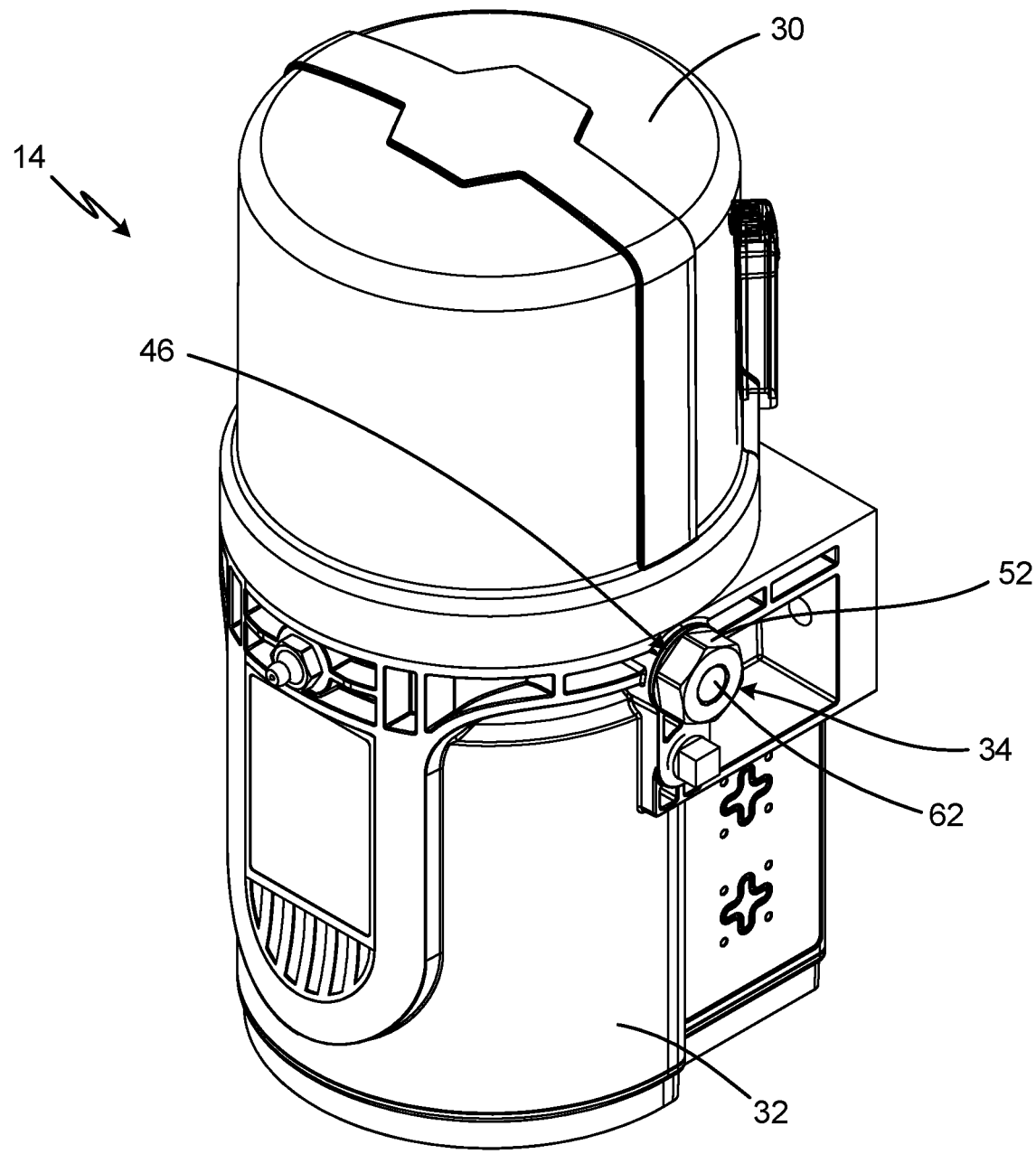
FIG. 2A is an isometric view of a lubricant pump.
Figure 2B:
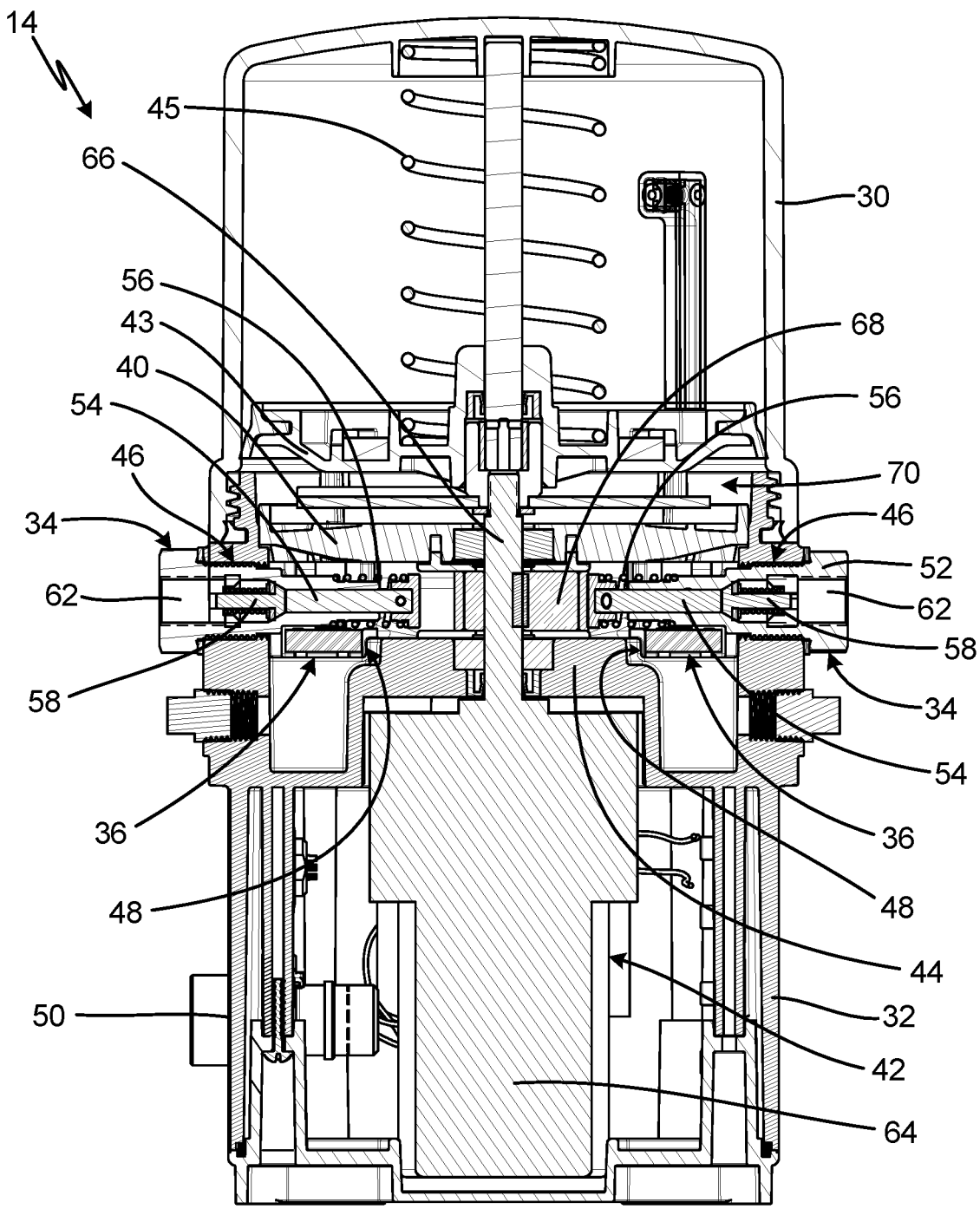
FIG. 2B is a cross-sectional view of the lubricant pump taken along line B-B in FIG. 2A.

FIG. 2A is an isometric view of lubricant pump 14. FIG. 2B is a cross-sectional view of lubricant pump 14 taken along line B-B in FIG. 2A. FIGS. 2A and 2B will be discussed together. Lubricant pump 14 includes reservoir housing 30, pump base 32, pump elements 34, heaters 36, ricer plate 40, drive 42, follower plate 43, and follower spring 45. Pump base 32 includes upper wall 44, pump ports 46, recesses 48, and power port 50. Pump element 34 includes pump body 52, piston 54, return spring 56, and check valve 58. Pump body 52 includes inlet 60 (shown in FIGS. 3A and 3B) and outlet 62. Drive 42 includes motor 64, drive shaft 66, and cam 68.

Lubricant pump 14 is configured to store and supply lubricant, such as grease or oil, for application to machinery. Reservoir housing 30 is mounted on pump base 32. Reservoir housing 30 and pump base 32 define the reservoir 70 within which lubricant is stored. Follower plate 43 is disposed in reservoir 70 and is configured to rise and fall within reservoir 70 along with the level of the lubricant in reservoir 70. Follower spring 45 biases follower plate 43 towards the top surface of the lubricant. Ricer plate 40 is mounted on pump base 32 and is disposed in reservoir housing 30. The lubricant flows through ricer plate 40 prior to encountering pump elements 34. Ricer plate 40 can break up the lubricant to ease flow into pump elements 34. While lubricant pump 14 is described as including a ricer plate 40, it is understood that some examples of lubricant pump 14 do not include a ricer plate 40.

Pump ports 46 extend through a portion of pump base 32. In the example shown, pump ports 46 extend into pump body 52 at a location between ricer plate 40 and upper wall 44. Upper wall 44 of pump base 32 defines a lower boundary of the reservoir 70. Upper wall 44 isolates the wet components of lubricant pump 14, which are those exposed to the lubricant, from the dry components of lubricant pump 14, which are those not exposed to the lubricant. Recesses 48 are formed in the portion of upper wall 44 facing the lubricant. Power port 50 extends into pump base 32 and is configured to receive an electrical power cord. In some examples, lubricant pump 14 can be powered by direct current (DC) power. In other examples, lubricant pump 14 can be powered by alternating current (AC) power.

Pump elements 34 are mounted to pump base 32 at pump ports 46. For each pump element 34, pump body 52 is secured within pump port 46 and extends through pump port 46 into reservoir 70. For example, pump body 52 can include external threading configured to interface with internal threading within pump port 46. It is understood, however, that pump body 52 can be secured in pump port 46 in any desired manner. While lubricant pump 14 is shown as including two pump elements 34, it is understood that some examples of lubricant pump 14 include a single pump element 34 and other examples of lubricant pump 14 can include more than two pump elements 34.

Check valve 58 is disposed in pump body 52. Piston 54 extends out of pump body 52 and into reservoir 70. Inlet 60 extends through pump body 52 at a location upstream of check valve 58. Outlet 62 is disposed on an opposite side of check valve 58 from inlet 60. Return spring 56 is disposed on an exterior of pump element 34 and is configured to drive piston 54 through a suction stroke.

Drive 42 is configured to power pump element 34. Motor 64 is mounted in pump base 32. Drive shaft 66 extends from motor 64 and through upper wall 44. Motor 64 can be of any desired configuration for driving drive shaft 66, such as an electric motor, a pneumatic motor, or a hydraulic motor, among other options. Cam 68 is eccentrically mounted on drive shaft 66. During operation, motor 64 drives rotation of drive shaft 66. Drive shaft 66 rotates and drives rotation of cam 68. Cam 68 is configured to push piston 54 of pump element 34 through a pumping stroke.

Heaters 36 are disposed in reservoir 70 on the wet side of upper wall 44. Heaters 36 are supported by pump base 32. Heaters 36 are mounted within recesses 48 such that heaters 36 are disposed below pump ports 46 and thus below pump body 52 of pump element 34. As such, pump body 52 extends over heater 36 when pump element 34 is mounted to pump base 32. Heater 36 is configured to increase the local temperature of the lubricant at pump element 34.

Heater 36 is configured to heat the local area around heater 36, including pump element 34 and the lubricant surrounding pump element 34. However, heater 36 does not heat the entire pump base 32 or the full volume of reservoir 70. In one example, heater 36 includes a self-regulating heater. For example, heater 36 can be a positive temperature coefficient (PTC) heater. A PTC heater is a self-regulating heater where the temperature generated by the heater 36 is regulated by the materials comprising the heater. The resistivity of the material increases with increasing temperature. As such, the PTC heater will produce high power when it is cold and will rapidly heat to a limit temperature. Due to the increasing resistivity as the temperature increase, the PTC heater is self-limiting in that it will not heat beyond the limit temperature. In one example, heaters 36 are PTC heaters having a limit temperature of about 65-degrees C. (about 150-degrees F.).

During operation, lubricant is stored in reservoir 70 prior to application. Motor 64 drives rotation of drive shaft 66. Drive shaft 66 drives rotation of cam 68. Cam 68 drives piston 54 forward within pump body 52 through a pumping stroke. The piston 54 increases the pressure within pump body 52 and drives the pressurized lubricant through check valve 58 and downstream out of pump element 34 through outlet 62. The lubricant flows from outlet 62 to an application point, such as a lubricant injector.

The cam 68 rotates away from pump element 34, removing the pushing force from piston 54 and begins to drive the piston 54 of the other pump element 34 through a pumping stroke. Return spring 56 pushes piston 54 through a suction stroke, where piston 54 is drawn through pump body 52 away from check valve 58. Pushing piston 54 through the suction stroke creates a void in pump body 52 between check valve 58 and the end of piston 54 disposed within pump body 52. The void continues to expand until the end of piston 54 reaches inlet 60. As the end of piston 54 passes inlet 60, the lubricant is drawn into pump body 52 by the void, thereby refilling pump element 34 for the next pumping stroke.

As the environmental temperature decreases, the lubricant becomes more viscous and does not flow as easily as at higher temperatures. In some cases, lubricant pump 14 is required to operate at environmental temperatures reaching 40-degrees C. below zero (negative 40-degrees) (about 40-degrees F. below zero). For example, lubricant pump 14 can be utilized in a wind turbine exposed to those harsh environmental temperatures.

Heaters 36 are disposed in lubricant pump 14 to ensure flow of lubricant even at very low environmental temperatures. A single one of heaters 36 will be discussed in detail, but it is understood that the discussion is applicable to both heaters 36 in lubricant pump 14. Heater 36 is disposed in recess 48 formed in pump base 32. Heater 36 is thus supported by pump base 32 and disposed between pump base 32 and pump body 52. Heater 36 is exposed to the lubricant within reservoir 70.

As discussed above, heater 36 can be a self-regulating heater such that the material properties of heater 36 limit the maximum temperature achievable by heater 36. For example, heater 36 can be a PTC thermistor. Heater 36 is electrically powered and is configured to heat the local area at pump element 34. Heater 36 increases the temperature of the lubricant surrounding pump element 34 and can increase the temperature of pump element 34 itself. In some examples, heater 36 is sized to raise the temperature of the lubricant about 10-degrees C. (about 50-degrees F.) relative to the other lubricant in reservoir 70. Increasing the local temperature reduces the viscosity of the lubricant at pump element 34, ensuring that pump element 34 can draw the lubricant into pump body 52 during the suction stroke and drive the lubricant downstream through outlet 62 during the pumping stroke. However, heaters 36 are not configured to heat the full volume of the lubricant within reservoir. In addition, heaters 36 directly heat the lubricant, as heaters 36 are exposed to the lubricant. Heaters 36 are not configured to heat other elements, such as pump base 32 or reservoir housing 30, that then transfer the heat from heaters 36 to the lubricant. It is understood, however, that heaters 36 can be enclosed within a local enclosure without deviating from the teachings of this disclosure.

Lubricant pump 14 provides significant advantages. Heaters 36 are disposed in reservoir 70 and heat the lubricant residing proximate pump element 34. Heaters 36 increase the local temperature at pump element 34, thereby decreasing the viscosity of the lubricant residing around pump element 34. Reducing the viscosity allows the lubricant to flow more easily, thereby ensuring that pump element 34 can effectively pump the lubricant even at very low temperatures. Providing local heating, as opposed to heating the full volume of lubricant in reservoir 70, consumes a small amount of power, allowing lubricant pump 14 to be powered by DC power and efficiently pump the lubricant. Moreover, heaters 36 being self-regulating heaters, such as PTC thermistors, allows heaters 36 to provide effective heating while eliminating the risk of overheating or excessive power consumption.

Figure 3A:
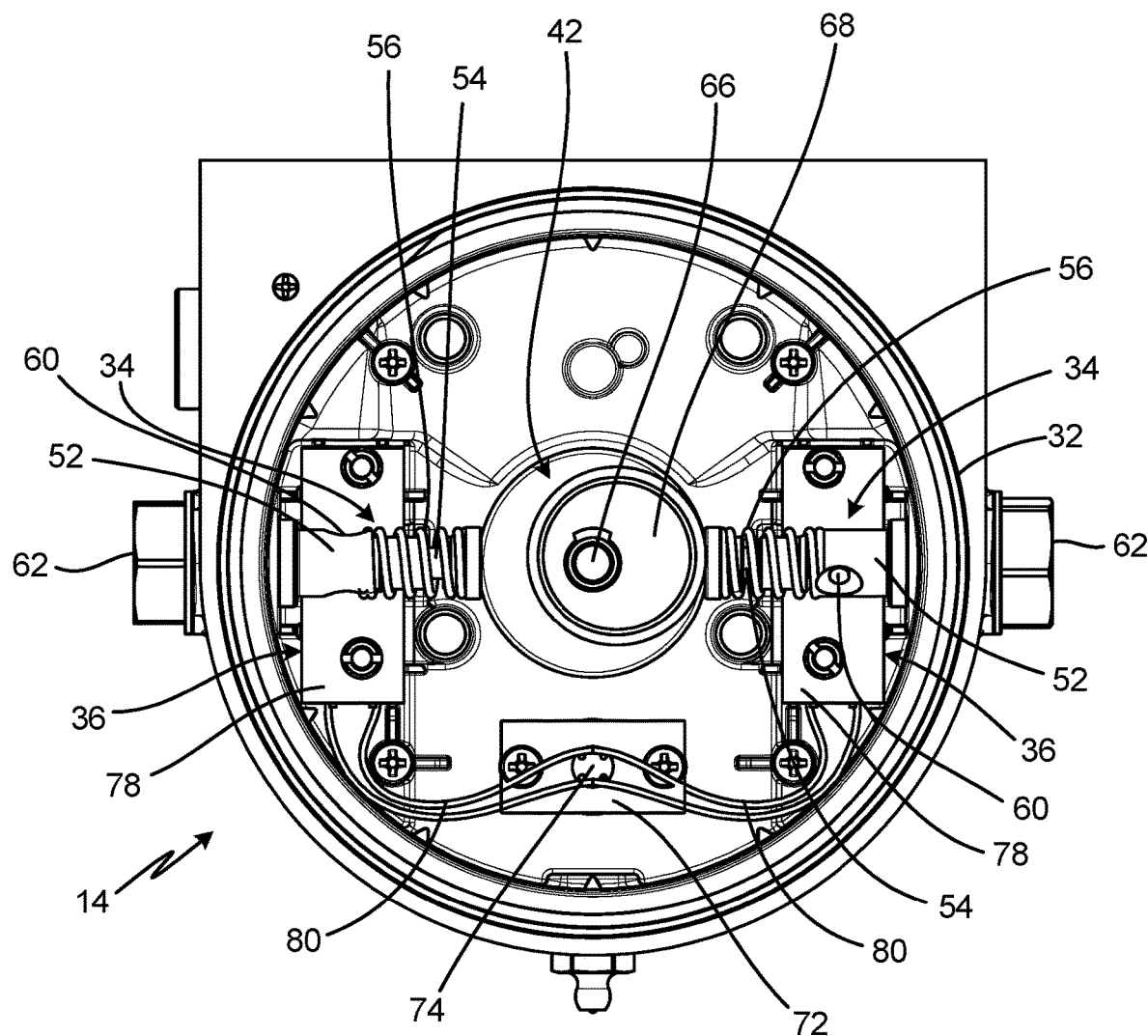
FIG. 3A is a top elevational view of pump base of a lubricant pump.
Figure 3B:
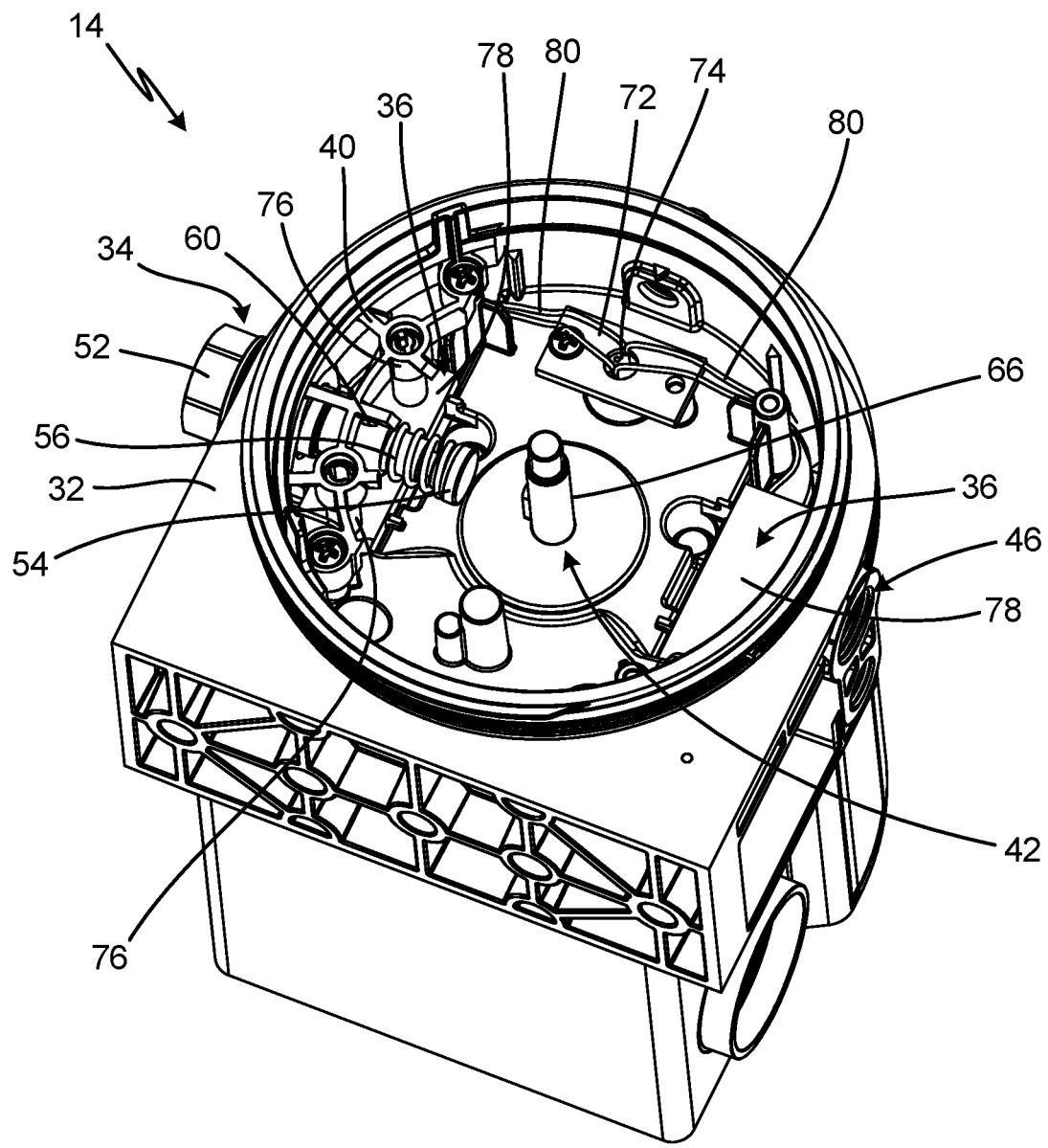
FIG. 3B is a top perspective view of a pump base of a lubricant pump.

FIG. 3A is a top elevational view of lubricant pump 14 with reservoir housing 30 removed. FIG. 3B is a top isometric view of lubricant with reservoir housing 30 removed. FIGS. 3A and 3B will be discussed together. Pump base 32, pump element 34, heaters 36, drive 42, top plate 72, and plug 74 of lubricant pump 14 are shown. A portion of ricer plate 40 is also shown in FIG. 3B. Ricer plate 40 includes pegs 76. Drive shaft 66 and cam 68 (FIG. 3A) of drive 42 are shown. Only one pump element 34 is shown in FIG. 3B. A pump port 46 (FIG. 3B) is shown without a pump element 34 mounted in the pump port 46. Pump body 52, piston 54 and return spring 56 of pump element 34 are shown. Inlet 60 and outlet 62 of pump body 52 are shown. Each heater 36 includes heating element 78 and power lines 80.

Pump base 32 houses the various power components of lubricant pump 14, such as drive 42. Drive shaft 66 of drive 42 extends through upper wall 44 of pump base 32 into reservoir 70 (best seen in FIG. 2B). Cam 68 is mounted on drive shaft 66. Pump element 34 is mounted to pump base 32 and extends through a first pump port 46 through pump base 32. A second pump port 46 is shown in FIG. 3B. Pump body 52 is at least partially disposed on the interior of pump base 32, such that pump body 52 is disposed within the lubricant stored in reservoir 70. Inlet 60 extends through a portion of pump body 52 within the interior of pump base 32. Inlet 60 provides a pathway for lubricant to enter pump body 52. Outlet 62 extends into a portion of pump body 52 on the exterior of pump base 32. Outlet 62 provides a pathway for lubricant to exit pump body 52. Piston 54 is disposed within pump body 52 and is reciprocate within pump body 52 to drive the lubricant. Return spring 56 extends between pump body 52 and an end of piston 54 disposed outside of pump body 52. Return spring 56 is configured to drive piston 54 through a suction stroke.

Heaters 36 are mounted within pump base 32 and are configured to heat the local area about each pump element 34. Heating elements 78 are supported by pump base 32. Heating elements 78 are disposed between upper wall 44 and pump body 52. Power lines 80 extend from each heating element 78 through plug 74. Plug 74 separates the wet portions of lubricant pump 14 from the dry portions within pump base 32. Top plate 72 is attached to pump base 32 over plug 74. Top plate 72 is configured to retain plug 74 in pump base 32 to prevent plug 74 from inadvertently loosening, which could allow lubricant to leak between the wet portion and the dry portion. Power lines 80 provide power to heating elements 78.

Ricer plate 40 is disposed in pump base 32 and secured to pump base 32. Pegs 76 project downward from a bottom side of ricer plate 40 towards upper wall 44 of pump base 32. Pegs 76 interface with, or are disposed adjacent to, a top side of each heating element 78. Pegs 76 retain heating elements 78 within recesses 48 (FIG. 2B) in pump base 32 during operation. Pegs 76 prevent heating elements 78 from displacing vertically while recesses 48 prevent heating elements 78 from displacing laterally. While heating elements 78 are shown as secured within recesses 48 by pegs 76, it is understood that heating elements 78 can be secured in any desired manner. For example, retainers, such as screws or bolts, can extend into pump base 32 proximate an edge of heating element 78. A flange, such as a washer or integral flange, can extend from the retainer over the edge of heating element 78 to secure heating element 78 in place.

During operation, drive shaft 66 rotates and drives cam 68. Cam 68 pushes piston 54 through a pumping stroke and return spring 56 pushes piston through a suction stroke. Lubricant is drawn into pump body 52 through inlet 60 during the suction stroke. Lubricant is driven out of pump body 52 through outlet 62 during the pumping stroke.

The viscosity of the lubricant increases as the environmental temperature around lubricant pump 14 decreases. Heaters 36 are configured to increase the local temperature of the lubricant at pump element 34 to decrease the viscosity of the lubricant and ensure efficient pumping by pump element 34.

Heating elements 78 receive power through power lines 80. As discussed above, heating elements 78 can be self-regulating heaters configured to heat to a maximum temperature. Heating elements 78 do not heat the entirety of the lubricant within reservoir 70, instead heating the local lubricant around pump element 34. Locally increasing the temperature at pump element 34 ensures that the lubricant around pump element 34, which is the first lubricant that will enter pump body 52 through inlet 60 is sufficiently fluidic that the lubricant flows into and through pump element 34. Moreover, by only heating the local area around pump element 34, heaters 36 consume relatively little power and can be operated with a DC power source.

Figure 4:
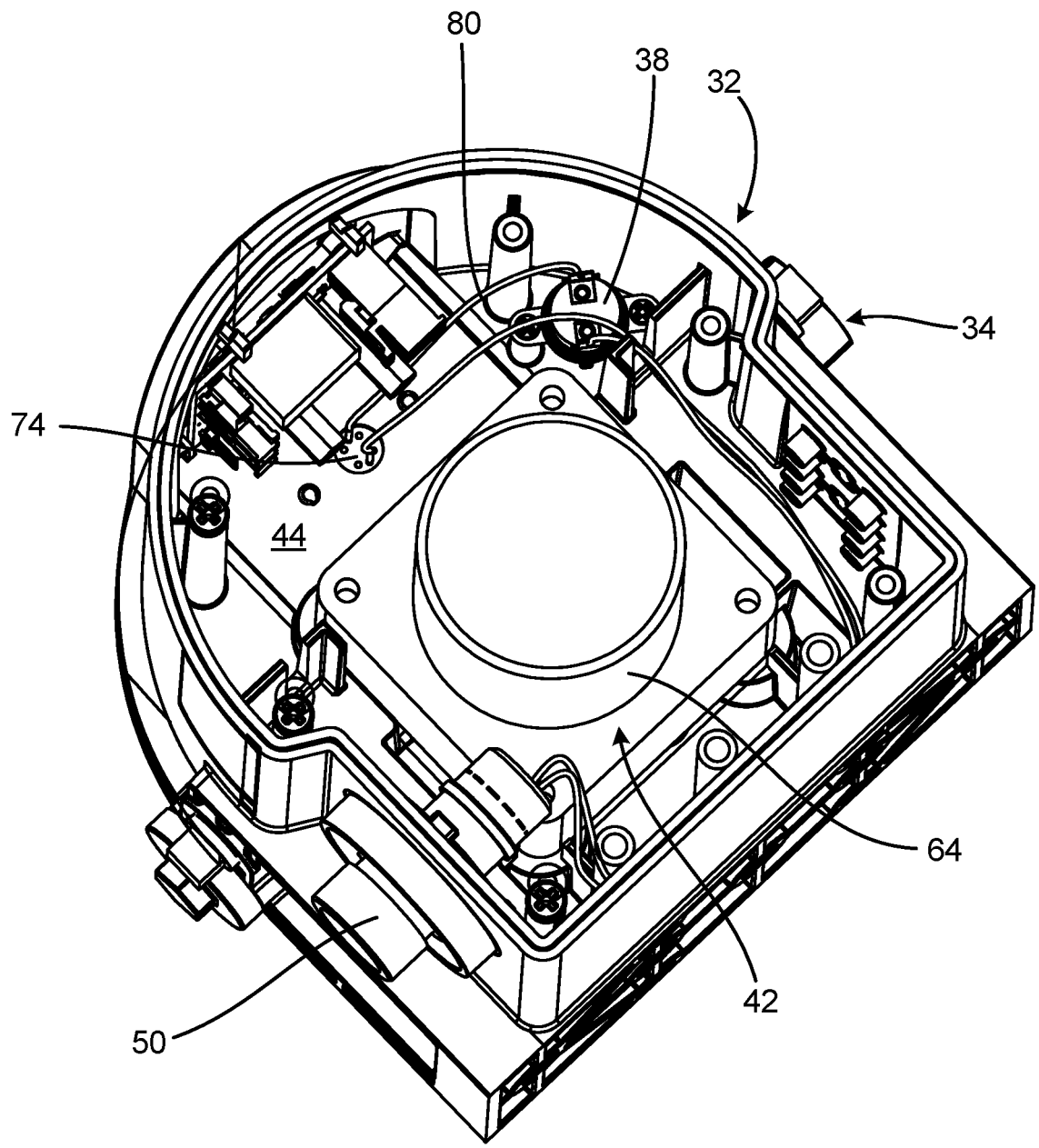
FIG. 4 is a bottom perspective view of a pump base of a lubricant pump.

FIG. 4 is a bottom isometric view of pump base 32. Pump base 32, a portion of pump element 34, thermal switch 38, motor 64 of drive 42 (best seen in FIG. 2B), power lines 80 of heaters 36 (best seen in FIGS. 3A and 3B), and plug 74 are shown. Upper wall 44 and power port 50 of pump base 32 are shown.

Power port 50 is disposed on a side of pump base 32 and is configured to receive a power cord from a power source, such as power source 16 (FIG. 1). Power lines 80 extend from the power source to heating elements 78 (best seen in FIGS. 3A and 3B). Power lines 80 extend to heating elements 78 through plug 74 in upper wall 44. In some examples, power lines 80 for the multiple heating elements 78 can combine into single wires to pass through plug 74. Power lines 80 are connected to thermal switch 38. Thermal switch 38 is mounted in the dry portion of pump base 32 such that thermal switch 38 is separated from and does not contact the lubricant.

Thermal switch 38 is configured to control activation and deactivation of heating elements 78. Thermal switch 38 is configured to close, connecting heating elements 78 to the power source, when the ambient temperature around thermal switch 38 reaches a lower threshold temperature. Thermal switch 38 is configured to open, disconnecting heating elements 78 from the power source, when the ambient temperature around thermal switch 38 reaches an upper threshold temperate. For example, thermal switch 38 can be a bimetallic snap disc thermostat, among other options.

Thermal switch 38 controls activation and deactivation of heating elements 78 to ensure that heating elements 78 heat the lubricant when temperatures are low enough to require heating of the lubricant, but that heating elements 78 are not active, and thus not consuming power, when temperatures are sufficiently high. In one example, the lower threshold is between about 0-degrees C. (about 32-degrees F.) and about 10-degrees C. below zero (about 14-degrees F.). More particularly, the lower threshold can be about 5-degrees C. below zero (about 23-degrees F.). In one example, the upper threshold is between about 4-degrees C. (about 39-degrees F.) and about 10-degrees C. (about 50-degrees F.). More particularly, the upper threshold can be about 7-degrees C. (about 45-degrees F.). It is understood, however, that thermal switch 38 can be configured to have any desired lower threshold and upper threshold.

The lower threshold and upper threshold can be based on the power of motor 64 and the properties of the lubricant being pumped, among other options. The lower threshold is set to prevent the viscosity of the lubricant from rising to an undesired level that could inhibit pumping. The upper threshold is set where the viscosity of the liquid is sufficiently low such that additional heating is not needed to facilitate flow of the lubricant into pump element 34. While thermal switch 38 is described as having a lower threshold and an upper threshold, it is understood that thermal switch 38 can be configured to have a single activation temperature. As such, thermal switch 38 can connect heating elements 78 to power when the temperature is at or below the activation temperature and can disconnect heating elements 78 from power when the temperature is at or above the activation temperature. Whether thermal switch 38 is open or closed at the activation temperature is based on the particular configuration of thermal switch 38.

Thermal switch 38 is disposed in pump base 32 such that thermal switch 38 is not exposed to the lubricant within lubricant pump 14. Thermal switch 38 controls activation and deactivation of heating elements 78 based on the air temperature at thermal switch 38. Disposing thermal switch 38 in pump base 32 isolates thermal switch 38 from the local temperature increase caused by heating elements 78. Isolating thermal switch 38 prevents undesired cycling of heaters 36 on and off as the local temperature at heaters 36 increases and decreases.

During operation, power is provided to lubricant pump 14. Motor 64 powers pump element 34 to cause pumping by pump element 34. Thermal switch 38 remains open, disconnecting power from heating elements 78, until the temperature at thermal switch 38 falls to the lower threshold temperature. Thermal switch 38 closes when the temperature reaches the lower threshold, thereby connecting power to heating element 78. Heating elements 78 generate heat and provide local heating of the lubricant and pump element 34. Heating elements 78 continue to generate heat so long as thermal switch 38 is closed. As discussed above, however, heaters 36 are self-regulating such that heating element 78 cannot generate heat above a threshold temperature.

Thermal switch 38 continues to provide power to heating elements 78 until the temperature at thermal switch rises to the upper limit. Thermal switch 38 opens when the temperature reaches the upper threshold, thereby disconnecting power from heating element 78, thereby shutting down heating element 78.

Thermal switch 38 provides significant advantages. Thermal switch 38 is mounted in the dry portion of pump base 32 such that thermal switch 38 is not exposed to the lubricant. As such, thermal switch 38 does not cycle open and closed due to a local temperature rise; instead, thermal switch 38 controls heating based on air temperature. Thermal switch 38 activates heating elements 78 when the temperature reaches the lower threshold, ensuring that heating elements 78 are powered only when needed to decrease the viscosity. Thermal switch 38 deactivates heating elements 78 when the temperature reaches the upper threshold, preventing unnecessary heating by heating elements 78.

Figure 5:
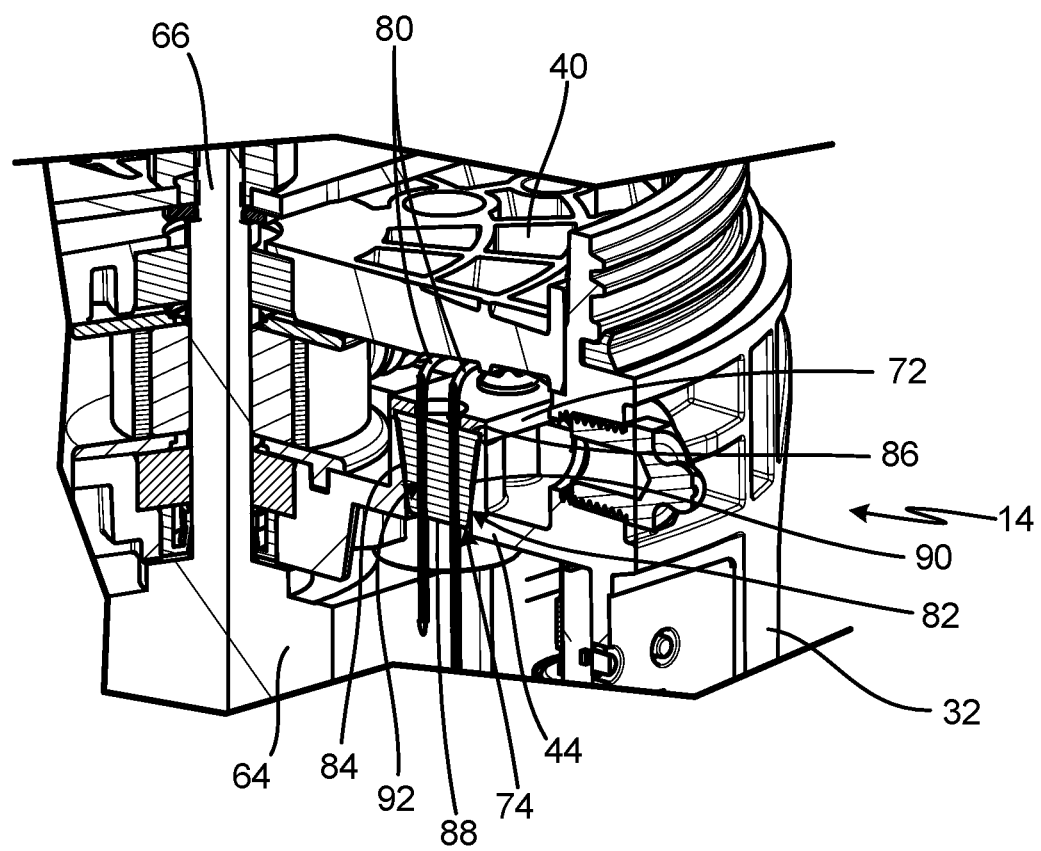
FIG. 5 is a cross-sectional view taken along line 5-5 in FIG. 3A.

FIG. 5 is a partial quarter-sectional view of a portion of lubricant pump 14. Pump base 32; ricer plate 40; motor 64, drive shaft 66, and cam 68 of drive 42; top plate 72, and plug 74 are shown. Upper wall 44 of pump base 32 is shown. Upper wall 44 includes plug bore 82, which includes sidewall 84. Power lines 80 of heaters 36 (best seen in FIGS. 3A and 3B) are shown. Plug 74 includes upper face 86, lower face 88, edge 90, and wire bores 92.

As discussed above, heaters 36 are configured to heat the local area surrounding pump elements 34 (best seen in FIGS. 2B and 3A). Power lines 80 extend from heating element 78 and into a dry portion of pump base 32. Power lines 80 are configured to provide power to heating elements 78 (best seen in FIGS. 3A and 3B) to power heating elements 78.

Plug bore 82 extends through upper wall 44 between. Plug bore 82 provides an opening for power lines 80 to extend from the wet portion of lubricant pump 14 into the dry portion of lubricant pump 14 and then to thermal switch 38 (FIG. 4). Plug 74 is mounted in plug bore 82 and provides a fluid seal at plug bore 82 to prevent the lubricant from flowing between the wet portion and the dry portion. Wire bores 92 extend through plug 74 between upper face 86 and lower face 88. Wire bores 92 provide passages for power lines 80 to extend through plug 74. Wire bores 92 can be sized such that lubricant cannot pass through wire bores 92 even when a power line 80 is not disposed in the wire bore 92.

Plug 74 is frustoconical such that edge 90 is tapered between upper face 86 and lower face 88, with upper face 86 having a larger diameter than lower face 88. Plug bore 82 is contoured to mate with plug 74. As such, sidewall 84 of plug bore 82 is also tapered between wet portion 26 and dry portion 28. The mating tapered profiles of plug 74 and plug bore 82 ensure a fluid tight seal is formed between plug 74 and plug bore 82. Top plate 72 is secured to pump base 32 and extends over upper face 86 of plug 74 to retain plug 74 within plug bore 82.

Although the present invention has been described with reference to preferred embodiments, workers skilled in the art will recognize that changes may be made in form and detail without departing from the spirit and scope of the invention.

The invention claimed is:

1. A lubricant pump comprising:
   a pump base having an upper wall;
   a reservoir housing mounted on the pump base, the reservoir housing and the upper wall defining a lubricant reservoir;
   a first pump element at least partially disposed in the lubricant reservoir;
   a first heating element disposed in the lubricant reservoir to be exposed to lubricant within the lubricant reservoir, the first heating element disposed proximate the first pump element and directly vertically below the first pump element, the first heating element disposed between the first pump element and the upper wall;
   a first recess formed in the upper wall, the first heating element is disposed in the first recess such that the first heating element is retained laterally within the first recess, wherein the first heating element is vertically retained within the first recess such that the first heating element is spaced vertically from the first pump element; and
   a thermal switch disposed in the pump base and electrically connected to the first heating element and configured to control activation and deactivation of the first heating element.

2. The lubricant pump of claim 1, wherein the first pump element is mounted to the pump base.

3. The lubricant pump of claim 1, wherein the first pump element comprises:
   a pump body mounted to the pump base and extending into the lubricant reservoir, the pump body including an inlet disposed in the lubricant reservoir;
   a piston disposed at least partially within the pump body; and
   a return spring interfacing with the piston and configured to drive the piston through a suction stroke.

4. The lubricant pump of claim 1, wherein the first heating element is a self-regulating heating element.

5. The lubricant pump of claim 4, wherein the first heating element is a positive temperature coefficient (PTC) thermistor.

6. The lubricant pump of claim 5, wherein a limit temperature of the first heating element is at most 65-degrees C. (150-degrees F.).

7. The lubricant pump of claim 1, wherein the thermal switch is configured to activate the first heating element based on an air temperature at the thermal switch being below a threshold and is further configured to deactivate the first heating element based on the air temperature being above the threshold.

8. The lubricant pump of claim 1, wherein the thermal switch is configured to activate the first heating element based on an air temperature at the thermal switch being at or below a lower threshold and is further configured to deactivate the first heating element based on the air temperature being at or above an upper threshold.

9. The lubricant pump of claim 8, wherein the lower threshold is between 0-degrees C. (32-degrees F.) and 10-degrees C. below zero (14-degrees F.).

10. The lubricant pump of claim 8, wherein the upper threshold is between 4-degrees C. (39-degrees F.) and 10-degrees C. (50-degrees F.).

11. The lubricant pump of claim 1, further comprising:
    a ricer plate disposed in the lubricant reservoir and supported by the pump base, wherein the first pump element is disposed between the ricer plate and the upper wall.

12. The lubricant pump of claim 11, wherein the ricer plate includes at least one peg extending from the ricer plate to the first heating element.

13. The lubricant pump of claim 1, further comprising:
    a second pump element at least partially disposed in the lubricant reservoir; and
    a second heating element disposed in the lubricant reservoir proximate the second pump element and between the second pump element and the pump base;
    wherein the second heating element is electrically connected to the thermal switch.

14. A lubrication system comprising:
    the lubricant pump of claim 1;
    a power source electrically connected to the lubricant pump; and
    a lubrication line extending from the first pump element to machinery, the lubrication line configured to convey lubricant from the lubricant pump to the machinery.

15. The lubrication system of claim 14, wherein the power source is configured to generate direct current power.

16. A lubricant pump comprising:
    a pump base having an upper wall;
    a reservoir housing mounted on the pump base, the reservoir housing and the upper wall defining a lubricant reservoir;
    a first pump element at least partially disposed in the lubricant reservoir;
    a first heating element disposed in the lubricant reservoir to be exposed to lubricant within the lubricant reservoir, the first heating element disposed proximate the first pump element and below the first pump element, the first heating element disposed between the first pump element and the upper wall;
    a first recess formed in the upper wall, the first heating element is disposed in the first recess;
    a second pump element at least partially disposed in the lubricant reservoir;
    a second heating element disposed in the lubricant reservoir proximate the second pump element and between the second pump element and the pump base;
    a second recess formed in the upper wall, the second heating element disposed in the second recess, wherein the second recess is formed separately from the first recess; and
    a thermal switch disposed in the pump base and electrically connected to the first heating element and the second heating element and configured to control activation and deactivation of the first heating element and the second heating element.

17. A lubricant pump comprising:
    a pump base having an upper wall;
    a reservoir housing mounted on the pump base, the reservoir housing and the upper wall defining a lubricant reservoir, wherein a bore extends through the upper wall;

a first pump element at least partially disposed in the lubricant reservoir;
a first heating element disposed in the lubricant reservoir to be exposed to lubricant within the lubricant reservoir, the first heating element disposed proximate the first pump element and below the first pump element, the first heating element disposed between the first pump element and the upper wall;
a thermal switch disposed in the pump base and electrically connected to the first heating element and configured to control activation and deactivation of the first heating element;
a plug mounted to the upper wall within the bore, the plug fluidly separating a wet portion of the lubricant pump within which the lubricant is disposed and a dry portion of the lubricant pump, wherein the plug includes an upper face oriented into the wet portion, a lower face oriented into the dry portion, and an edge extending between the upper face and the lower face; and
a power line extending between the thermal switch and the first heating element, the power line extending through a wire bore in the plug;
wherein the edge of the plug interfaces with a sidewall of the bore to fluidly separate the wet portion and the dry portion.

* * * * *